(No Model.)
A. CALLER.
MEAT BROILER.
No. 398,493. Patented Feb. 26, 1889.
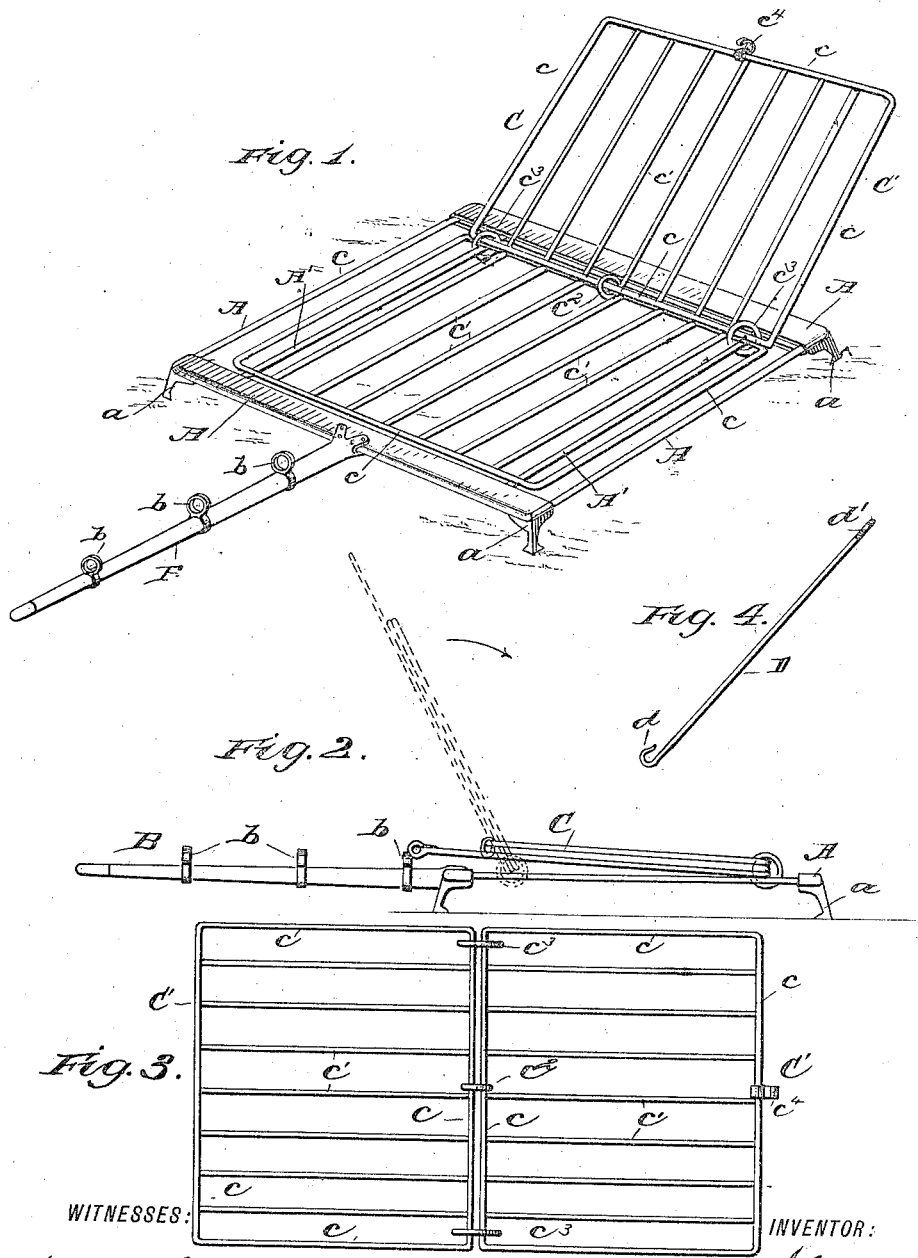

UNITED STATES PATENT OFFICE.

ANNIE CALLER, OF ALBANY, NEW YORK, ASSIGNOR TO HERSELF AND ALICE J. PUTNAM, OF SAME PLACE.

MEAT-BROILER.

SPECIFICATION forming part of Letters Patent No. 398,493, dated February 26, 1889.

Application filed August 6, 1888. Serial No. 282,038. (No model.)

*To all whom it may concern:*

Be it known that I, ANNIE CALLER, of Albany, in the county of Albany and State of New York, have invented a new and useful Improvement in Meat-Broilers, of which the following is a full, clear, and exact description.

The object of the invention is to so improve the construction of broilers as to provide for the ready turning of the meat without removing it from the broiler and without removing the latter from the fire.

To this end the invention consists in a folding skeleton frame so connected to guide-rods on the base as to be readily moved to either end of said base and either member of said frame presented to the fire, and in details of construction, as herein particularly described, and pointed out in the claims.

Reference is to be had to the accompanying drawings, forming a part of this specification, in which similar letters of reference indicate corresponding parts in all the figures.

Figure 1 is a perspective view of a meat-broiler constructed in accordance with my invention, the skeleton meat-clamping frame being opened. Fig. 2 is a side view, the skeleton frame being closed and in the lowered position, the dotted lines indicating said frame in raised position and adapted to be moved to either end of the base to present either face of the same to the fire. Fig. 3 is a plan view of the skeleton frame opened, and Fig. 4 is a perspective view of a hook employed to turn the skeleton frame and to hang up the broiler.

The base or body of the broiler consists, preferably, of a rectangular frame, A, provided with suitable supporting-legs, $a$, and with a handle, B.

The frame A is an open one, and extending across the same from front to rear are two wires or rods, A', which serve to support the meat-clamping frame C, and to which the said frame is pivotally secured.

The frame C consists of the two members C' C', formed of wire or light metal bars, and preferably constructed with a rectangular frame, $c$, and a series of longitudinal wires or bars, $c'$. The two sections C' C' are hinged together by means of rings $c^2$ $c^3$ $c^3$, the two outer or end rings, $c^3$ $c^3$, thereof also being caused to embrace the rods A' of body A.

In using the broiler the meat is placed between the members C' C' of the frame, and the latter are clamped or held together by means of a suitable catch, $c^4$, on one member engaging the opposite frame, $c$, of the other member. The meat having been broiled sufficiently on one side, the frame containing the same is engaged by the hook D at any convenient portion of the free end of the frame— that is, the end opposite the hinged end— and the whole frame raised vertically, turning on its hinges, whereupon the hinged end may be moved along the guide rods or wires A' to the opposite end of the base or body A, and lowered to present the opposite member of the frame and the uncooked side of the meat to the fire.

To the handle B are secured, or upon it are formed, a series of eyes, $b$, which are adapted to receive the hook D when the broiler is not in use. The hooked end $d$ of the hook is passed through the eyes $b$ and caused to engage the inner eye, $b$, whereby the eye $d'$, formed on the handle end of the hook, may be passed over a nail and the broiler thus hung up. The latter arrangement is also desirable, because it insures the presence of both the hook and broiler when required for use, and prevents the former from being mislaid or lost.

Having thus fully described my invention, I claim as new and desire to secure by Letters Patent—

1. A broiler comprising an open frame having parallel cross rods or wires and a reversible meat-holding frame having a sliding hinge-connection at one end with said cross-rods, substantially as set forth.

2. The combination, with the body or base of the broiler, provided with guide rods or wires, of the meat-holding frame and rings or eyes sliding on said guide rods or wires, and connected to one end of the meat-holding frame, substantially as set forth.

3. The combination, with the body or base of the broiler, provided with guide rods or wires, of the skeleton meat-holding frame formed of two hinged members and hinged to the said guide-rods by rings, substantially as described.

4. A broiler consisting in an open frame having cross wires or rods, a meat-holding frame hinged to and sliding upon said cross-rods, a handle secured to the open frame and having an eye on one side, and a separate and independent suspending and operating rod having an eye at its outer end and a hook at its inner end, whereby the meat-holding frame may be slid by said rod, and said rod passed through the handle-eye to engage its hook with the swinging end of the meat-holding frame to hold it against the open frame when the broiler is to be suspended, substantially as set forth.

ANNIE CALLER.

Witnesses:
 RUSSELL M. JOHNSTON,
 WILLIAM JOHNSON